US012679403B1

(12) United States Patent
Kim et al.

(10) Patent No.: US 12,679,403 B1
(45) Date of Patent: Jul. 14, 2026

(54) ELECTRONIC CONTROL UNIT CLOCK

(71) Applicant: Zoox, Inc., Foster City, CA (US)

(72) Inventors: Juchan Kim, Palo Alto, CA (US);
Aman Sehgal, San Francisco, CA (US)

(73) Assignee: Zoox, Inc., Foster City, CA (US)

( * ) Notice: Subject to any disclaimer, the term of this patent is extended or adjusted under 35 U.S.C. 154(b) by 214 days.

(21) Appl. No.: 18/241,097

(22) Filed: Aug. 31, 2023

(51) Int. Cl.
B60W 60/00 (2020.01)
G04R 20/02 (2013.01)
G06F 1/04 (2006.01)

(52) U.S. Cl.
CPC .......... B60W 60/001 (2020.02); G04R 20/02 (2013.01); G06F 1/04 (2013.01); B60W 2556/50 (2020.02)

(58) Field of Classification Search
CPC . B60W 60/001; B60W 2556/50; G04R 20/02; G06F 1/04
See application file for complete search history.

(56) References Cited

U.S. PATENT DOCUMENTS

| | | | |
|---|---|---|---|
| 10,649,459 B2 | 5/2020 | Wang et al. | |
| 12,007,487 B1 * | 6/2024 | Robinson | .......... B60W 50/0205 |
| 2020/0116502 A1 * | 4/2020 | Xu | .......... G01C 21/26 |
| 2023/0399011 A1 * | 12/2023 | Anvari | .......... B60W 50/06 |

FOREIGN PATENT DOCUMENTS

KR 20230008715 A * 1/2023 ........ H04W 56/0015

* cited by examiner

*Primary Examiner* — Peter D Nolan
*Assistant Examiner* — Matthew Cobb
(74) *Attorney, Agent, or Firm* — Lee & Hayes, P.C.

(57) ABSTRACT

Techniques for generating and/or updating a timekeeping mechanism for an ECU are described herein. Monotonic and/or global time sources may be used to generate and/or update a real time clock used by component(s) of an autonomous vehicle. In some examples, a clock manager may receive a monotonic time value from a monotonic clock and a global time value from a global clock. The clock manager may use the monotonic time value and the global time value to generate an adjustment factor. In some instances, the clock manager may store the adjustment factor in a read-only shared memory location. In such instances, vehicle component may determine a predicted current time based on reading the adjustment factor from the shared memory and the monotonic time value. Upon determining the predicted current time, the vehicle component may synchronize a real time clock of the vehicle component according to the predicted current time.

20 Claims, 5 Drawing Sheets

500 ⟶

RECEIVE A FIRST TIME FROM A MONOTONIC TIME SOURCE OF A VEHICLE
502

RECEIVE A SECOND TIME FROM A GLOBAL TIME SOURCE
504

GENERATE AN ADJUSTMENT FACTOR BASED ON THE FIRST TIME AND THE SECOND TIME
506

STORE THE ADJUSTMENT FACTOR IN A SHARED MEMORY LOCATION
508

TIME SINCE LAST MODIFICATION MEETS OR EXCEEDS THE UPDATE FREQUENCY?
510

YES

300

RECEIVE UPDATE OF TIME VALUE FOR GLOBAL POSITIONING SYSTEM (GPS)
302

SYNCHRONIZE TIME VALUE OF PTP CLOCK BASED ON GPS TIME VALUE
304

UPDATE ADJUSTMENT FACTOR BASED ON THE PTP CLOCK TIME VALUE
306

DETERMINE, BASED ON RECEIVING THE ADJUSTMENT FACTOR AND BY A
COMPONENT OF A VEHICLE, A PREDICTED CURRENT REAL TIME
308

500 ⬎

RECEIVE A FIRST TIME FROM A MONOTONIC TIME SOURCE OF A VEHICLE
502

RECEIVE A SECOND TIME FROM A GLOBAL TIME SOURCE
504

GENERATE AN ADJUSTMENT FACTOR BASED ON THE FIRST TIME AND THE SECOND TIME
506

STORE THE ADJUSTMENT FACTOR IN A SHARED MEMORY LOCATION
508

TIME SINCE LAST MODIFICATION MEETS OR EXCEEDS THE UPDATE FREQUENCY?
510

YES

ELECTRONIC CONTROL UNIT CLOCK

BACKGROUND

Robotic systems, such as autonomous vehicles, may include computing systems configured to receive, generate, analyze, and output data to control the operations of the robotic systems. Such systems may receive and/or request the data at various times and/or intervals. Specifically, some systems may receive and/or require updated data at different intervals than other computing systems. In such instances, upon receiving such data, the computing systems may associate the data with a timestamp of the real-world time to indicate the time at which the data was received. Associating timestamps to data may help the computing systems make accurate determinations when analyzing such data over time. However, in many cases, techniques for maintaining and/or updating the current real-world time can result in inaccurate times (or timestamps), making these techniques suboptimal and/or insufficient.

BRIEF DESCRIPTION OF THE DRAWINGS

The detailed description is described with reference to the accompanying figures. In the figures, the left-most digit(s) of a reference number identifies the figure in which the reference number first appears. The use of the same reference numbers in different figures indicates similar or identical components or features.

DETAILED DESCRIPTION

Figure 1:
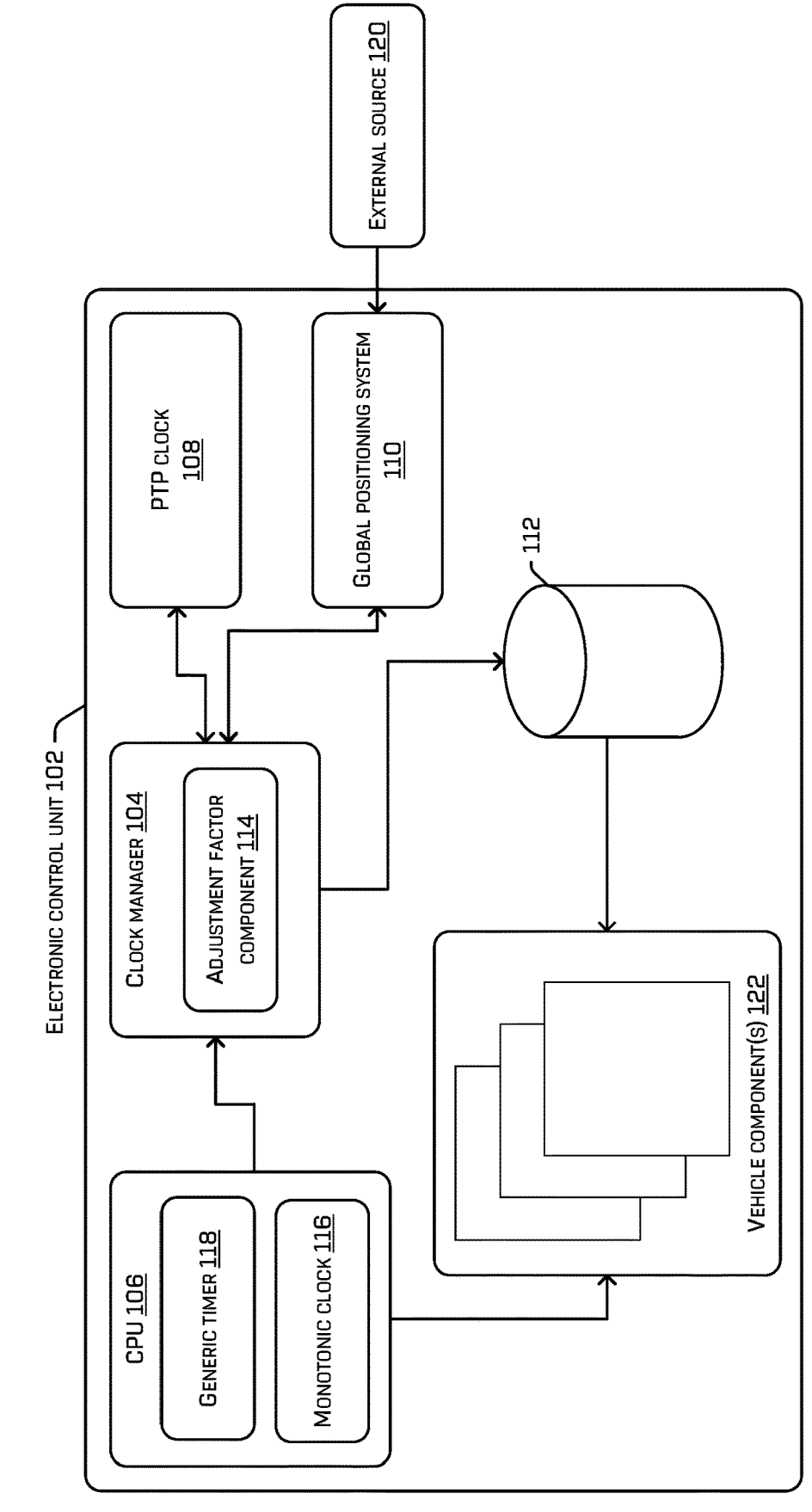
FIG. 1 illustrates an example system including a clock manager configured to generate and/or maintain a timekeeping mechanism for an electronic control unit (ECU), in accordance with one or more examples of the disclosure.

As described above, conventional techniques for maintaining and/or updating the real-time clock of an ECU can result in inaccurate times (or timestamps), making these techniques suboptimal and/or insufficient.

Techniques for generating and/or updating a timekeeping mechanism for an ECU are described herein. As described herein, monotonic and/or global time sources may be used to generate and/or update an adjustment factor accessible (e.g., read only) to one or more components of an autonomous vehicle. In some examples, a clock manager may receive a monotonic time value from a monotonic clock on the vehicle, and a global time value from a global clock (e.g., precision time protocol clock (e.g., PTP clock), global positioning system (e.g., GPS), etc.). The clock manager may use the monotonic time value and the global time value to generate or otherwise calculate an adjustment factor. In some instances, the clock manager may store the adjustment factor in a shared memory location. Components of the vehicle and/or ECU may receive (e.g., read) the adjustment factor by reading from the location of shared memory in which the clock manager stored the adjustment factor. In such instances, the components of the vehicle may determine a predicted current time based on the adjustment factor and the monotonic time value. As discussed throughout this disclosure, the techniques described herein may improve vehicle safety and/or driving efficiency by generating and/or updating an adjustment factor that operates independently of an operating system scheduler, thereby enabling the computing systems of the vehicle and/or ECU to maintain a higher resolution real time clock.

Some existing systems for maintaining and/or updating a clock of an ECU may cause a lack of security and/or accuracy of the clock time. For example, certain existing systems may use ECU clocks that update (e.g., increment) according to a predetermined frequency. Such a frequency may be based on an operating system ("OS") scheduler tick period. A tick period may be a frequency and/or duration of a processing cycle within the OS. In such instances, the period at which the ECU clock is updated may be bound to the tick period of the OS scheduler. The scheduler is a component of the OS that determines which thread the ECU is to perform at which time, and which CPU should be assigned to run the thread. The OS scheduler makes these determinations at each tick period. For instance, if the OS scheduler tick period is 1 second, the OS scheduler may determine which thread to run once every second. Additionally, the ECU clock may be incremented once every second. However, in some instances, a component (e.g., a safety-critical system) running on the ECU may receive and/or analyze new vehicle data at intervals higher than (i.e., more frequent than) the OS scheduler tick period. In such instances, the component may be unable to retrieve an accurate timestamp from the ECU clock. For example, the component may receive new vehicle data every half-second while the OS scheduler tick period is once a second. As such, when the component retrieves a timestamp at t=0, the component will receive a first time. Further, when the component retrieves a timestamp at t=0.5, the component will receive the same time as the time received at t=0 because the ECU clock is not set to be updated until t=1. Of course, this is merely an example, and in other examples the OS scheduler tick period may be at a higher or lower interval, and vehicle components may receive data and/or retrieve timestamps at different intervals. In order to provide and/or maintain a more accurate clock with a higher resolution level, the OS scheduler tick period (i.e., the period at which the clock is updated) needs to be modified. However, increasing the OS scheduler tick period frequency causes the central processing unit ("CPU") to incur additional computational constraints, limiting the bandwidth of the CPU. In other examples, components of the vehicle and/or ECU may have capabilities to write to, or modify, the ECU clock. That is, the clock may be accessible (e.g., read and write) to one or more components of the ECU. As such, a component may modify the time associated with the ECU clock which may result in vehicle components receiving inaccurate time values when such components request a timestamp. Consequently, the limitations to conventional timekeeping techniques may result in inaccurate clock data, excessive computational constraints on the CPU, and/or a lack in clock security.

To address these and other technical problems and inefficiencies, the systems and/or techniques described herein include a clock management system (which also may be referred to as a "clock management component" or a "clock manager") configured to maintain and/or update a timekeeping mechanism for an ECU. The clock manager may leverage one or more monotonic and/or global time sources to update an ECU adjustment factor at a frequency independent of the OS scheduler tick period. Technical solutions discussed herein solve one or more technical problems associated with using inaccurate clock data and/or unnecessarily constraining the CPU.

Initially, a clock manager may generate a new adjustment factor on the ECU when the autonomous vehicle (or other robotic system) is activated (e.g., turned on). The ECU may be a hardware component used by the vehicle. The ECU may be configured to run software and be responsible for various controls of the vehicle. In some instances, the ECU may include one or more CPUs that can be used for various purposes. In some examples, upon determining that the vehicle is turned on, the clock manager may create or otherwise initialize shared memory (e.g., stored in RAM) within the ECU. The shared memory may be used to store an adjustment factor (e.g., stored in a global time frame) that can be accessed (e.g., read-only access) by the components of the ECU. As such, components of the ECU and/or external to the ECU may be unable to write to and/or modify the shared memory.

In some instances, the clock manager may maintain an accuracy and/or resolution level of the adjustment factor data by updating the adjustment factor. That is, the clock manager may update the adjustment factor at a predetermined frequency (e.g., incrementing the clock every 1 second, 5 milliseconds, 1 microsecond, etc.). A resolution level may indicate the degree of detail and/or accuracy of the adjustment factor data. For instance, a high-resolution level may indicate that the adjustment factor is updated or otherwise incremented at a higher frequency than the update frequency at a lower resolution level. As such, updating the adjustment factor at a high-resolution level may yield more precise and/or accurate clock times (for the clocks of ECU components) than updating the adjustment factor at a low-resolution level. In some examples, such adjustment factor updates may ensure that the clock data of components of the ECU are synchronized to a global real time.

In some examples, the clock manager may update or otherwise synchronize the real time clock of the ECU. The clock manager may use one or more monotonic and/or global time sources to generate a predicted current time which may be used to update the real time clock. In such instances, the clock manager may use the monotonic time and global times to generate an adjustment factor which may be used to convert the monotonic time to a global time frame, as described below.

For example, the clock manager may receive a time value from a monotonic clock (e.g., monotonic time source) of the ECU. A monotonic clock may be a hardware component disposed on the CPU located on the ECU. The monotonic clock may be updated or otherwise incremented by a counter (e.g., generic timer) that measures the passage of time. In some instances, each core of the CPU may include an individual counter. The monotonic clock may have a high-resolution level that results in the monotonic clock being updated every 100 nanoseconds. Of course, in other examples the monotonic clock may be updated at a higher or lower frequency.

In some examples, the clock manager may also receive a time value from a global clock. In some instances, the clock manager may determine an adjustment factor based on the global time value. The global time value may also enable the clock manager to ensure that the real time clocks of ECU components are synchronized to a global real time. In some examples, the clock manager may receive the global time value from a PTP clock that is located on the ECU. The PTP clock may be updated once a second based on a global positioning system ("GPS") located on the ECU. In some examples, the GPS may be updated once every second by an external source with global time data. Of course, in other examples the PTP clock and the GPS may be updated at different rates and/or and higher or lower frequencies. In some examples, the GPS may be updated by an external source, the PTP clock updates or otherwise syncs with the GPS clock, and the clock manager receives the global time value from the PTP clock.

In some examples, the clock manager may determine an adjustment factor based on the global time value and the monotonic time value. The adjustment factor may be used to convert the monotonic time value to a global time frame. Further, the adjustment factor may be a constantly updated offset that may be applied to the monotonic time value by programs and services running on the same system. In some examples, the clock manager may determine the adjustment factor by subtracting the global time (i.e., received by the PTP clock) from the monotonic time value. Upon determining the adjustment factor, the clock manager may store the adjustment factor in a location of the shared memory that is read-only accessible to the component(s) (e.g., vehicle components, ECU components, user components, etc.) of the vehicle. In some examples, a component of the vehicle may receive the adjustment factor from the stored memory to determine a real time value for the clock of the component. For example, component(s) of the vehicle and/or ECU may receive the adjustment factor data from the shared memory. In such instances, the component(s) may determine a predicted current time based on the monotonic time value and the adjustment factor. The predicted current time may be an estimation of the current global real time. The component(s) may determine the predicted current time by combining (e.g., adding together) the adjustment factor with the monotonic time value. In such instances, the component(s) may associate the determined predicted real time with data to establish at what time the data was collected or otherwise received.

In examples, during an initialization process, software components running on an operating system with a clock manager. During initialization, a memory space in primary (e.g., random access memory) can be designated for storing clock offset value(s). The memory space may be write accessible by the clock manager only with all user software components only having read access. During the initialization phase, the software components who wish to access the clock offsets provided by the clock manager may be provided a pointer to the offset storage location and/or to the clock manager itself (e.g., to invoke an update or for other reasons).

Alternatively or additionally, the clock manager may modify or adjust the resolution level of the adjustment factor by modifying the frequency at which the adjustment factor is updated. That is, the clock manager and/or one or more external sources may increase the resolution level by increasing the frequency at which the adjustment factor is updated. In such instances, the resolution level may be changed without impacting or effecting the OS scheduler tick period. As such, the clock manager or external source may increase or decrease the resolution of the clock without limiting the bandwidth of the CPU.

The techniques described herein can improve the functioning, safety, and efficiency of autonomous and semi-autonomous vehicles operating in various driving environments. Using one or more monotonic and global time sources can enable the components of the ECU to operate independent of the OS scheduler tick period. Specifically, generating an adjustment factor while using monotonic and global clocks may enable the vehicle to adjust the resolution of the component clock without being bound to the OS scheduler. The vehicle can adjust the frequency at which the adjustment factor is updated while not being bound to the OS scheduler. Thus, the component clocks can achieve a high-resolution level without constraining the CPU bandwidth. Additionally, using monotonic and global clocks may allow the vehicle to increase clock resolution to provide a more accurate representation of the real-world time to the one or more components using and/or operating on the ECU. Specifically, operating independent of the OS scheduler allows the vehicle to increase the frequency at which the adjustment factor is updated beyond that of the OS scheduler tick period. Increasing the frequency at which the adjustment factor is updated allows the component clocks to be more precise. For instance, instead of being updated once every second, the adjustment factor may be updated multiple times per second. As such, the updated adjustment factor may enable components of the vehicle to associate more accurate timestamps with data. The memory access schema of providing software components read access to the offsets may also not violate security schemas put in place by microcontroller and/or operating system manufacturers.

The techniques described herein can be implemented in a number of ways. Example implementations are provided below with reference to the following figures. Although discussed in the context of an autonomous vehicle, the methods, apparatuses, and systems described herein can be applied to a variety of systems (e.g., a sensor system or robotic platform), and are not limited to autonomous vehicles. Moreover, at least some of the techniques described herein may be utilized with driver-controlled vehicles. While examples are given with respect to land vehicles (e.g., cars, vans, trucks, or other wheeled or tracked vehicles), these techniques also can be utilized in aviation or nautical contexts. Additionally, the techniques described herein may be used with real data (e.g., captured using sensor(s)), simulated data (e.g., generated by a simulator), or any combination of the two FIG. 1 illustrates an example system 100 including a clock manager 104 configured to generate and/or maintain a timekeeping mechanism for an electronic control unit (ECU) 102.

As shown in this example, the example system 100 may include an example ECU 102 with one or more subcomponents. The ECU 102 may be a hardware component of a vehicle (or other robotic system) configured to manage one or more controls (e.g., tracking a trajectory, managing the drive train, detecting faults, managing vehicle power, managing the steering and/or steering sensors, etc.) of the vehicle. In some instances, the ECU 102 may include a timekeeping mechanism configured to maintain an updated adjustment factor for the components that are within, or otherwise interact with, the ECU 102. For instance, the ECU 102 may include one or more subcomponents which may be used to generate and/or maintain an adjustment factor for the ECU. Such components may include a clock manager 104, a CPU 106, a PTP clock 108, a GPS 110, and/or a shared memory 112 configured to store the current adjustment factor (e.g., adjustment factor data). Of course, this example is not intended to be limiting, and in other examples the ECU 102 may include more or less components. Shared memory 112 may be random access memory (RAM) or similar memory that has a relatively lower access latency as composed to storage/secondary memory. This low latency may support a clock with a high update frequency by enabling adjustment factors to be stored and read from with low enough latency to have minimal impact to clock readings/calculations. In examples, the latency of access to memory 112 can be less than a clock resolution or a clock adjustment access and calculation time by a clock manager.

In some examples, the ECU 102 may include a clock manager 104 configured to generate and/or maintain a timekeeping mechanism for the ECU 102. The clock manager 104 may be implemented within or otherwise associated with an ECU 102 and/or any other component of an autonomous vehicle. In some examples, the clock manager 104 may include various components, described below, configured to perform different functionalities of a real time clock managing technique. In some examples, some or all of the subcomponents of the clock manager 104 may be integrated in on-vehicle systems while other subcomponents of the clock manager 104 may be integrated in a remote server-based system.

In some examples, the clock manager 104 may include an adjustment factor component 114 configured to determine and/or store an adjustment factor in a shared memory read-only accessible to vehicle and/or user components. For example, the adjustment factor component 114 may determine an adjustment factor according to a predetermined frequency. The adjustment factor component 114 may receive a monotonic time value from a monotonic clock 116 on the CPU 106. Further, the adjustment factor component 114 may receive a global time value (e.g., global time value) from a PTP clock 108. In such instances, the adjustment factor component 114 may send a request to the PTP clock 108 for a timestamp of the current time. As one or more other components may be interacting with the PTP clock 108, the clock manager 104 may determine that the request sent by the adjustment factor component 114 may include a priority level that is higher than some or all other components' requests. That is, if the adjustment factor component 114 sends a request to the PTP clock 108, such a request may be responded to before a request from another component. In other examples, the clock manager 104 may also include the global positioning system 110 as a subcomponent. In some examples, clock manager 104 may be assigned a priority level for scheduling by an operating system wherein the priority level is higher than other components. The priority level may assure that processes corresponding to updating clocks are not interrupted or delayed by other services or processing running on a shared processor.

In some instances, the adjustment factor component 114 may generate or otherwise calculate the adjustment factor by subtracting the monotonic time value from the global time value. Upon determining the adjustment factor, the adjustment factor component 114 may write the adjustment factor data into a location of the shared memory 112.

In some examples, the ECU 102 may include a CPU 106 configured execute hardware and/or software instructions running on the ECU 102. Though the ECU 102 is shown as including a single CPU 106, in other examples the ECU 102 may include one or more CPUs. The CPU 106 may include one or more subcomponents such as a generic timer 118 and a monotonic clock 116. Though shown as two distinct components, in other examples the generic timer 118 and the monotonic clock 116 may be a single component. The generic timer 118 may be a system counter configured to measure the passing of time in real time. The generic timer 118 may be built into the CPU 106. That is, each core of the CPU 106 may include a unique generic timer 118 that measures the passage of time. Of course this is merely an example, in other examples some or all of the cores of the CPU 106 may utilize the same or different generic timer 118. In some examples, the generic timer 118 may be configured to increment the monotonic clock 116 which, as shown, may also be a hardware component on the CPU 106. The generic timer 118 may update or otherwise increment the monotonic clock 116 at a particular frequency and/or resolution level (e.g., every 100 nanoseconds, 5 milliseconds, 1 microsecond, etc.).

In some examples, the CPU 106 may include a monotonic clock 116 configured to represent the passage of time. The monotonic clock 116 may be a hardware component on the CPU 106. In such instances, the adjustment factor component 114 may be able to quickly access and/or retrieve data from the monotonic clock. Though shown in FIG. 1 as including a single monotonic clock 116, the CPU 106 may include one or more monotonic clocks 116 configured to perform similar or identical operations. The monotonic clock 116 may be configured to send or otherwise transmit a monotonic time value to the adjustment factor component 114 which may use the monotonic time value to determine the adjustment factor and, ultimately for conversion of the monotonic time value to a global time domain.

In some examples, the ECU 102 may include a PTP clock 108 configured to represent the passage of time as provided by an external source 120. The PTP clock 108 may be a time source that is updated or otherwise incremented at the same or similar frequency as the GPS 110. In some instances, the time value of the PTP clock 108 may be synchronized with the time value of the GPS 110. In some examples, the PTP clock 108 may exchange clock data with the adjustment factor component 114 and/or the clock manager 104. That is, the adjustment factor component 114 and/or the clock manager 104 may request, receive, retrieve, or access the time value of the PTP clock. In such instances, the adjustment factor component 114 may use the time value obtained from the PTP clock 108 to synchronize the clock data stored in the shared memory 112.

In some examples, the ECU 102 may include a GPS 110 configured to provide the ECU 102 with positioning and/or timing data. Though shown as being external to the clock manager 104, in other examples the GPS 110 may be a subcomponent of the clock manager 104. The GPS 110 may be a time source that is updated or otherwise synchronized according to a predetermined frequency. The frequency may be determined or otherwise based on the frequency at which the external source 120 sends signals to the GPS 110. In such instances, the time value of the GPS 110 may receive clock data, timestamps, or other time related data from an external source 120. The external source 120 may be a satellite and/or system of satellites configured to send one or more signals to the GPS 110. However, in other examples, the external source 120 may be any other type of external clock. In some examples, the GPS 110 may be configured to provide clock data (e.g., timestamps) to the clock manager 104, which may use such data to update the PTP clock 108. In other examples, if the GPS 110 is located within the clock manager 104, the GPS 110 and/or the clock manager 104 may transmit or otherwise send timestamps to the PTP clock 108.

In some examples, the ECU 102 may include one or more vehicle components 122 configured to perform various functions and/or operations of an autonomous vehicle (or other robotic system). Although FIG. 1 illustrates three potential vehicle components, in other examples there may be more or less vehicle components, some of which may be external to the ECU 102. Some examples of vehicle components may include a trajectory tracking component, a drive train component, a fault detecting component, a vehicle power component, a battery component, a steering component, a steering sensor component, and/or any other vehicle or robotic component. In some examples, such components may receive, obtain, and/or analyze data from one or more systems of the vehicle. In order to organize and/or accurately analyze the data, the vehicle components 122 may associate a timestamp of a predicted current real time with the newly obtained data. The vehicle components 122 may determine or otherwise generate a predicted current real time. The predicted current real time may be based on the monotonic time value (received from the monotonic clock 116 or the generic timer 118) and the adjustment factor (received from the shared memory 112). The shared memory 112 may be accessible to multiple components of the ECU and/or one or more components external to the ECU. In other examples, one or more components external to the ECU may lack permissions to access the shared memory. In some examples, vehicle component 122 may receive or otherwise read the adjustment factor from the shared memory 112. Vehicle component 122 may use the adjustment factor to read a local monatomic time (e.g., from a CPU) and determine a real time as disclosed herein. A timestamp may be a value indicating the real time of the time at which the request was made to the shared memory 112 or when the local clock is accessed. As noted above, associating timestamps with data may enable the vehicle components 122 to accurately evaluate the change in data over time (e.g., as the vehicle progresses within an environment).

Figure 2:
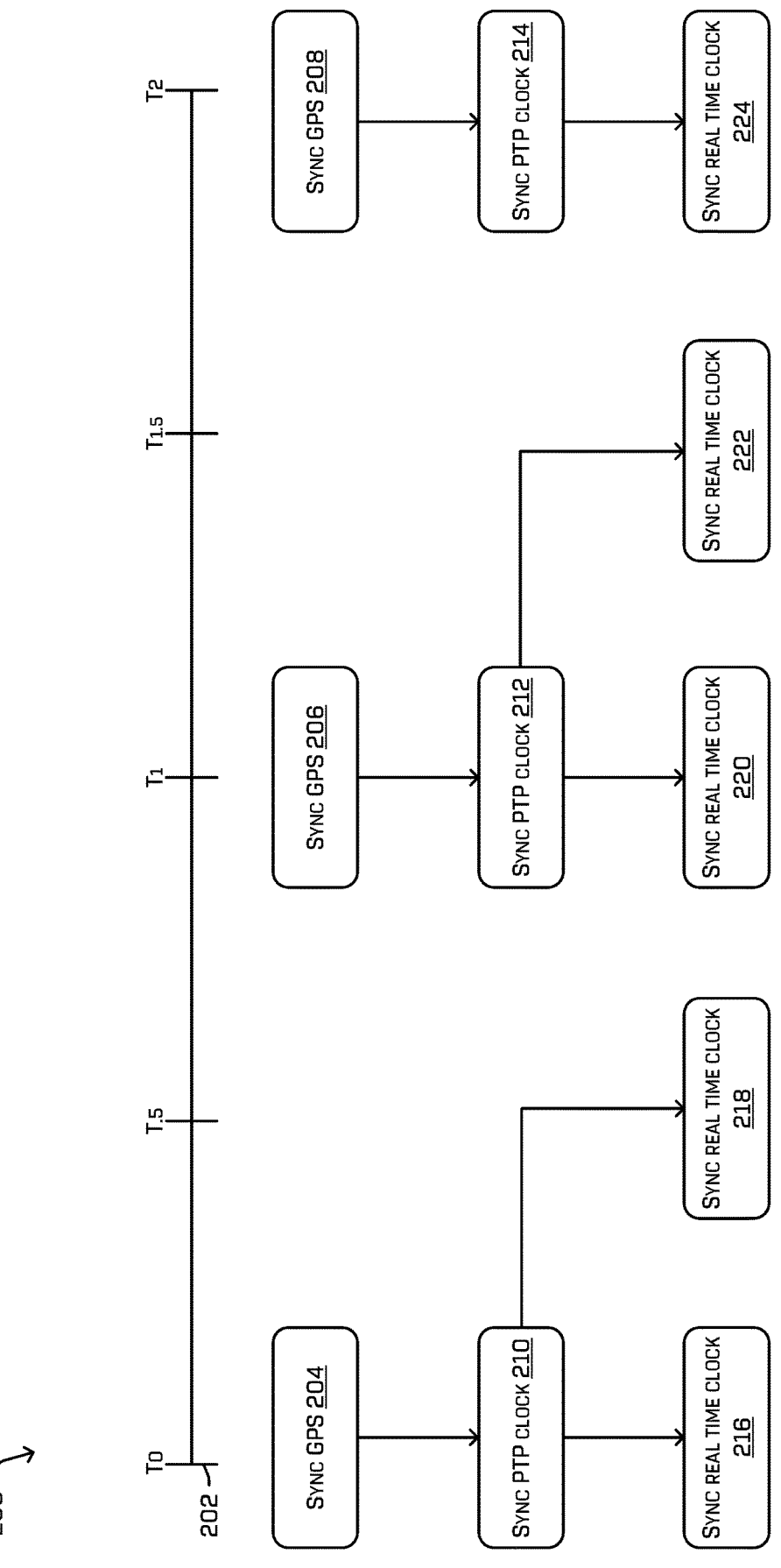
FIG. 2 is a pictorial flow diagram illustrating an example technique for updating a real time clock of an ECU over time, in accordance with one or more examples of the disclosure.

FIG. 2 is a pictorial flow diagram 200 illustrating an example technique for updating a real time clock of components of an ECU at various intervals.

In some examples, the flow diagram 200 may include a timeline 202. In this example, the timeline 202 may start at "$t_0$" and span to "$t_2$"; however, in other examples the timeline 202 may start or stop at differing time ranges. As shown, the timeline 202 may include one or more markings at each half-second. Accordingly, the timeline 202 may include "$t_0$", "$t_{0.5}$", "$t_1$", "$t_{1.5}$", and "$t_2$". In some examples, the operations shown (e.g., synchronizing the various types of clocks) may occur at the time at which the operation is located.

In some examples, the flow diagram 200 may include one or more operations to synchronize the GPS. In this example, the flow diagram 200 may include a sync GPS 204 operation at "$t_0$", a sync GPS 206 operation at "$t_1$", and a sync GPS 208 operation at "$t_2$". Accordingly, the GPS in this example may be updated once every second. As described above, the time value of the GPS may be updated based on receiving a signal from one or more satellites. In such instances, the time value of the GPS may remain the same until the next update period. For instance, the time value of the GPS at "$t_0$" will remain the same until the time value of the GPS is updated at "$t_1$" (e.g., sync GPS 206).

In some examples, the flow diagram 200 may include one or more operations to synchronize the PTP clock. In this example, the flow diagram 200 may include a sync PTP clock 210 operation at "$t_0$", a sync PTP clock 212 operation at "$t_1$", and a sync PTP clock 214 operation at "$t_2$". Accordingly, the PTP clock in this example may be updated once every second. As described above, the time value of the PTP clock may synchronize based on the time value of the GPS. In some instances, the time value of the PTP clock may remain the same until the next update period. For instance, the time value of the PTP clock at "$t_0$" will remain the same until the PTP clock is updated at "$t_1$" (e.g., sync PTP clock 212). Accordingly, when the clock manager attempts to update the adjustment factor (e.g., used to synchronize the component real time clock), the clock manager may receive the same time value from the PTP clock (i.e., global clock) when the clock manager requests a time between "$t_0$" and "$t_1$".

In some examples, the flow diagram 200 may include one or more operations to synchronize or otherwise update the real time clock of a component of the ECU. In this example, the flow diagram 200 may include a sync real time clock 216 operation at "$t_0$", a sync real time clock 218 operation at "$t_{0.5}$", a sync real time clock 220 operation at "$t_1$", a sync real time clock 222 operation at "$t_{1.5}$", and a sync real time clock 224 operation at "$t_2$". In this example, the clock manager may update the real time clock once every half-second. As described above, the time value of the real time clock may synchronize or otherwise update based on the time values of the PTP clock and the monotonic clock. Updating the real time clock every half-second may ensure that the real time clock has a more precise time value than it would have had with a longer update frequency.

In some examples, at "$t_0$" the operation sync GPS 204 may cause the time value of the GPS to be updated. Further, at "$t_0$", the operation sync PTP clock 210 may update the time value of the PTP clock based on the time value of the updated GPS time value. At "$t_0$", the operation sync real time clock 216 may result in the clock manager updating the adjustment factor. In such examples, a vehicle component may update the component real time clock based on the PTP and monotonic clocks (e.g., adjustment factor). As such, at "$t_0$", the time value of the GPS, the time value of the PTP clock, and the time value of the real time clock may each be the same global time value. However, at "$t_{0.5}$" the operation sync real time clock 218 may result in the component updating the real time clock based on the time value of the PTP and monotonic clocks (e.g., adjustment factor). In this instance, the clock manager may determine the adjustment factor by using the time value of the PTP clock updated at "$t_0$" since the PTP clock has not yet been updated. Accordingly, at "$t_{0.5}$" the component may receive the adjustment factor updated at "$t_{0.5}$" to determine the predicted current real time. The component clock may have a time value representative of the current predicted global real time, whereas the time value of the GPS and the time value of the PTP clock remain the same as they were at "$t_0$".

In some examples, at "$t_1$" the operation sync GPS 206 may cause the time value of the GPS to be updated. Further, at "$t_1$", the operation sync PTP clock 212 may update the time value of the PTP clock based on the time value of the updated GPS time value. At "$t_1$", the operation sync real time clock 220 may result in the clock manager updating the adjustment factor which may enable a vehicle component to update the component real time clock based on the PTP and monotonic clocks. As such, at "$t_1$", the time value of the GPS, the time value of the PTP clock, and the time value of the real time clock may each be the same global time value. However, at "$t_{1.5}$" the operation sync real time clock 222 may result in the component updating the real time clock based on the time value of the PTP and monotonic clocks (e.g., adjustment factor). In this instance, the clock manager may determine the adjustment factor by using the time value of the PTP clock updated at "$t_1$" since the PTP clock has not yet been updated. Accordingly, at "$t_{1.5}$" the component may receive the adjustment factor updated at "$t_{1.5}$" to determine the real time clock. The component real time clock may have a time value representative of the current predicted global real time, whereas the time value of the GPS and the time value of the PTP clock remain the same as they were at "$t_1$".

In some examples, at "$t_2$" the operation sync GPS 208 may cause the time value of the GPS to be updated. Further, at "$t_2$", the operation sync PTP clock 214 may update the time value of the PTP clock based on the time value of the updated GPS time value. At "$t_2$", the operation sync real time clock 224 may result in the clock manager updating the real time clock of the ECU based on the PTP and monotonic clocks. As such, at "$t_2$", the time value of the GPS, the time value of the PTP clock, and the time value of the real time clock may each be the same global time value.

Figure 3:
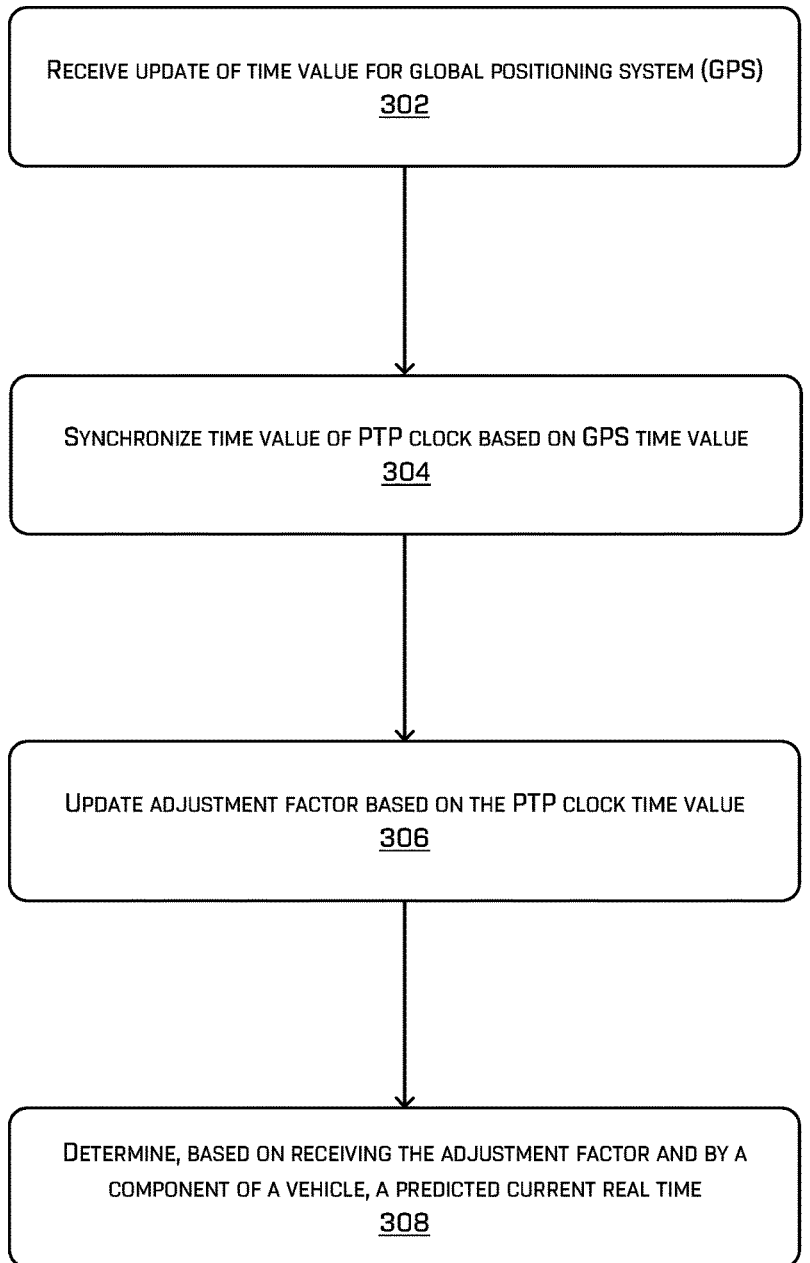
FIG. 3 is a flow diagram illustrating an example process for updating a global positioning system, PTP time source, and real time clock, in accordance with one or more examples of the disclosure.

FIG. 3 is a flow diagram illustrating an example process 300 for updating a GPS, PTP time source, and real time clock. Specifically, FIG. 3 illustrates the interaction between the various components (e.g., GPS, PTP clock, ECU clock, and vehicle components).

At operation 302, the GPS may receive an update to the GPS time value based on a global real time. For example, the time value of the GPS may have a timekeeping mechanism that is configured to maintain a particular resolution level. That is, the time value of the GPS may be updated at a predetermined frequency to ensure that the precision of the GPS time value is sufficiently accurate. As noted above, one or more external sources may be configured to update and/or increment the time value of the GPS. For example, the external source may be a satellite or system of satellites configured to send one or more signals to the GPS. In such instances, the signals may include clock data which may cause or otherwise result in the time value of the GPS being updated.

At operation 304, the PTP clock may synchronize the PTP clock time value based on the GPS time value. As noted above, the PTP clock may be a component of the ECU which is configured to update at a similar or identical frequency to the time value of the GPS. Accordingly, at each update period, the PTP clock may synchronize the time value of the PTP clock with the updated time value of the GPS. As such, after synchronizing with the time value of the GPS, the PTP clock may have an accurate, current, global real time value.

At operation 306, the real time clock may update the adjustment factor based on the PTP clock time value. As described above, the ECU may have a timekeeping mechanism that is configured to enable vehicle components to obtain a high level of clock resolution. For instance, the clock manager may update the adjustment factor according to a predetermined frequency. In such instances, the clock manager may receive a time value from the PTP clock (e.g., global time source) as well as from a monotonic clock. In such instances, the clock manager may receive the time value from the PTP clock that was used to update the PTP clock at operation 304. In some instances, the clock manager may use the time value of the PTP clock and the monotonic time value to generate the adjustment factor. In such instances, the clock manager may update the adjustment factor stored in the shared memory by writing the updated adjustment factor to the shared memory.

At operation 308, one or more components of a vehicle may determine a predicted current real time based on reading the adjustment factor from the shared memory. In some examples, the vehicle and/or ECU may include one or more components configured to receive, obtain, and/or analyze data from one or more devices and/or components of the vehicle. In order to organize and/or accurately evaluate the data, the components may associate a timestamp (e.g., predicted current real time) with the newly obtained data. The components may determine the predicted current real time by receiving the adjustment factor from the shared memory and the monotonic time value from the monotonic clock. In such instances, the components may determine the predicted current real time by combing the adjustment factor with the monotonic time value. As noted above, associating timestamps with data may enable the vehicle components to accurately evaluate the change in data over time (e.g., as the vehicle progresses within an environment). In some examples, the clock manager may receive a monotonic time value representing a time value of 1:00:017 in nanoseconds, while receiving a global time value (from the PTP clock) that indicates the global time value is 1:00:01. In such instances, the clock manager may determine, based on the monotonic and global time values, an adjustment factor. In such instances, the adjustment factor may be 0.007. As such, the clock manager may store the adjustment factor in shared memory. Further, a component of the vehicle may determine a predicted current real time by reading the adjustment factor from the shared memory and receiving a monotonic time from the monotonic clock. As such, the component may add the adjustment factor to the monotonic time value. The predicted current real time may be a more precise and/or accurate representation of the actual real-world time.

Figure 4:
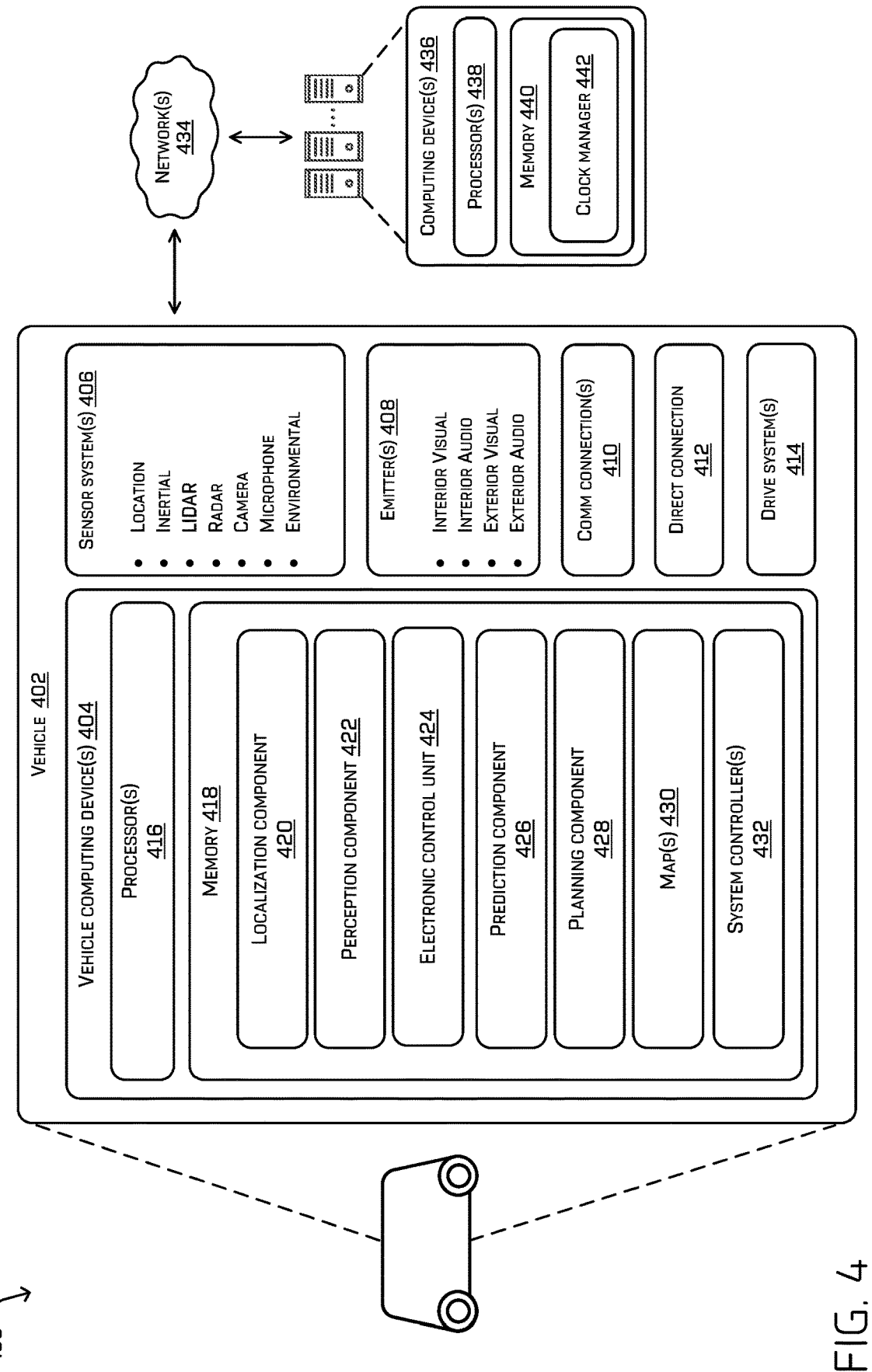
FIG. 4 depicts a block diagram of an example system for implementing various techniques described herein.

FIG. 4 is a block diagram of an example system 400 for implementing the techniques described herein. In at least one example, the system 400 may include a vehicle, such as vehicle 402. The vehicle 402 may include one or more vehicle computing devices 404, one or more sensor systems 406, one or more emitters 408, one or more communication connections 410, at least one direct connection 412, and one or more drive systems 414.

The vehicle computing device 404 may include one or more processors 416 and memory 418 communicatively coupled with the processor(s) 416. In the illustrated example, the vehicle 402 is an autonomous vehicle; however, the vehicle 402 could be any other type of vehicle, such as a semi-autonomous vehicle, or any other system having at least an image capture device (e.g., a camera-enabled smartphone). In some instances, the autonomous vehicle 402 may be an autonomous vehicle configured to operate according to a Level 5 classification issued by the U.S. National Highway Traffic Safety Administration, which describes a vehicle capable of performing all safety-critical functions for the entire trip, with the driver (or occupant) not being expected to control the vehicle at any time. However, in other examples, the autonomous vehicle 402 may be a fully or partially autonomous vehicle having any other level or classification.

In the illustrated example, the memory 418 of the vehicle computing device 404 stores a localization component 420, a perception component 422, an electronic control unit 424, a prediction component 426, a planner component 428, one or more system controllers 432, and one or more maps 430 (or map data). Though depicted in FIG. 5 as residing in the memory 418 for illustrative purposes, it is contemplated that the localization component 420, the perception component 422, the electronic control unit 424, the prediction component 426, the planner component 428, system controller(s) 432, and/or the map(s) may additionally, or alternatively, be accessible to the vehicle 402 (e.g., stored on, or otherwise accessible by, memory remote from the vehicle 402, such as, for example, on memory 440 of one or more computing device 436 (e.g., a remote computing device)). In some examples, the memory 440 may include a clock manager 442.

In at least one example, the localization component 420 may include functionality to receive sensor data from the sensor system(s) 406 to determine a position and/or orientation of the vehicle 402 (e.g., one or more of an x-, y-, z-position, roll, pitch, or yaw). For example, the localization component 420 may include and/or request/receive a map of an environment, such as from map(s) 430, and may continuously determine a location and/or orientation of the vehicle 402 within the environment. In some instances, the localization component 420 may utilize SLAM (simultaneous localization and mapping), CLAMS (calibration, localization and mapping, simultaneously), relative SLAM, bundle adjustment, non-linear least squares optimization, or the like to receive image data, lidar data, radar data, inertial measurement unit (IMU) data, GPS data, wheel encoder data, and the like to accurately determine a location of the vehicle 402. In some instances, the localization component 420 may provide data to various components of the vehicle 402 to determine an initial position of the vehicle 402 for determining the relevance of an object to the vehicle 402, as discussed herein.

In some instances, the perception component 422 may include functionality to perform object detection, segmentation, and/or classification. In some examples, the perception component 422 may provide processed sensor data that indicates a presence of an object (e.g., entity) that is proximate to the vehicle 402 and/or a classification of the object as an object type (e.g., car, pedestrian, cyclist, animal, building, tree, road surface, curb, sidewalk, unknown, etc.). In some examples, the perception component 422 may provide processed sensor data that indicates a presence of a stationary entity that is proximate to the vehicle 402 and/or a classification of the stationary entity as a type (e.g., building, tree, road surface, curb, sidewalk, unknown, etc.). In additional or alternative examples, the perception component 422 may provide processed sensor data that indicates one or more features associated with a detected object (e.g., a tracked object) and/or the environment in which the object is positioned. In some examples, features associated with an object may include, but are not limited to, an x-position (global and/or local position), a y-position (global and/or local position), a z-position (global and/or local position), an orientation (e.g., a roll, pitch, yaw), an object type (e.g., a classification), a velocity of the object, an acceleration of the object, an extent of the object (size), etc. Features associated with the environment may include, but are not limited to, a presence of another object in the environment, a state of another object in the environment, a time of day, a day of a week, a season, a weather condition, an indication of darkness/light, etc.

The prediction component 426 may generate one or more probability maps representing prediction probabilities of possible locations of one or more objects in an environment. For example, the prediction component 426 may generate one or more probability maps for vehicles, pedestrians, animals, and the like within a threshold distance from the vehicle 402. In some instances, the prediction component 426 may measure a track of an object and generate a discretized prediction probability map, a heat map, a probability distribution, a discretized probability distribution, and/or a trajectory for the object based on observed and predicted behavior. In some instances, the one or more probability maps may represent an intent of the one or more objects in the environment.

In some examples, the prediction component 426 may generate predicted trajectories of objects (e.g., objects) in an environment. For example, the prediction component 426 may generate one or more predicted trajectories for objects within a threshold distance from the vehicle 402. In some examples, the prediction component 426 may measure a trace of an object and generate a trajectory for the object based on observed and predicted behavior.

In general, the planner component 428 may determine a path for the vehicle 402 to follow to traverse through an environment. For example, the planner component 428 may determine various routes and trajectories and various levels of detail. For example, the planner component 428 may determine a route to travel from a first location (e.g., a current location) to a second location (e.g., a target location). For the purpose of this discussion, a route may include a sequence of waypoints for travelling between two locations. As non-limiting examples, waypoints include streets, intersections, global positioning system (GPS) coordinates, etc. Further, the planner component 428 may generate an instruction for guiding the vehicle 402 along at least a portion of the route from the first location to the second location. In at least one example, the planner component 428 may determine how to guide the vehicle 402 from a first waypoint in the sequence of waypoints to a second waypoint in the sequence of waypoints. In some examples, the instruction may be a candidate trajectory, or a portion of a trajectory. In some examples, multiple trajectories may be substantially simultaneously generated (e.g., within technical tolerances) in accordance with a receding horizon technique. A single path of the multiple paths in a receding data horizon having the highest confidence level may be selected to operate the vehicle. In various examples, the planner component 428 may select a trajectory for the vehicle 402.

In other examples, the planner component 428 may alternatively, or additionally, use data from the localization component 420, the perception component 422, and/or the prediction component 426 to determine a path for the vehicle 402 to follow to traverse through an environment. For example, the planner component 428 may receive data (e.g., object data) from the localization component 420, the perception component 422, and/or the prediction component 426 regarding objects associated with an environment. In some examples, the planner component 428 receives data for relevant objects within the environment. Using this data, the planner component 428 may determine a route to travel from a first location (e.g., a current location) to a second location (e.g., a target location) to avoid objects in an environment. In at least some examples, such a planner component 428 may determine there is no such collision-free path and, in turn, provide a path that brings vehicle 402 to a safe stop avoiding all collisions and/or otherwise mitigating damage.

The electronic control unit 424 may also perform any of the techniques described with respect to any of FIGS. 1-3 above with respect to generating and/or maintaining a real time clock.

In at least one example, the vehicle computing device 404 may include one or more system controllers 432, which may be configured to control steering, propulsion, braking, safety, emitters, communication, and other systems of the vehicle 402. The system controller(s) 432 may communicate with and/or control corresponding systems of the drive system(s) 414 and/or other components of the vehicle 402.

The memory 418 may further include one or more maps 430 that may be used by the vehicle 402 to navigate within the environment. For the purpose of this discussion, a map may be any number of data structures modeled in two dimensions, three dimensions, or N-dimensions that are capable of providing information about an environment, such as, but not limited to, topologies (such as intersections), streets, mountain ranges, roads, terrain, and the environment in general. In some instances, a map may include, but is not limited to: texture information (e.g., color information (e.g., RGB color information, Lab color information, HSV/HSL color information), and the like), intensity information (e.g., lidar information, radar information, and the like); spatial information (e.g., image data projected onto a mesh, individual "surfels" (e.g., polygons associated with individual color and/or intensity)), reflectivity information (e.g., specularity information, retroreflectivity information, BRDF information, BSSRDF information, and the like). In one example, a map may include a three-dimensional mesh of the environment. In some examples, the vehicle 402 may be controlled based at least in part on the map(s) 430. That is, the map(s) 430 may be used in connection with the localization component 420, the perception component 422, the prediction component 426, and/or the planner component 428 to determine a location of the vehicle 402, detect objects in an environment, generate routes, determine actions and/or trajectories to navigate within an environment.

In some examples, the one or more maps 430 may be stored on a remote computing device(s) (such as the computing device(s) 436) accessible via network(s) 434. In some examples, multiple maps 430 may be stored based on, for example, a characteristic (e.g., type of entity, time of day, day of week, season of the year, etc.). Storing multiple maps 430 may have similar memory requirements, but increase the speed at which data in a map may be accessed.

In some instances, aspects of some or all of the components discussed herein may include any models, techniques, and/or machine-learned techniques. For example, in some instances, the components in the memory 418 (and the memory 440, discussed below) may be implemented as a neural network.

As described herein, an exemplary neural network is a technique which passes input data through a series of connected layers to produce an output. Each layer in a neural network may also comprise another neural network, or may comprise any number of layers (whether convolutional or not). As may be understood in the context of this disclosure, a neural network may utilize machine learning, which may refer to a broad class of such techniques in which an output is generated based on learned parameters.

Although discussed in the context of neural networks, any type of machine learning may be used consistent with this disclosure. For example, machine learning techniques may include, but are not limited to, regression techniques (e.g., ordinary least squares regression (OLSR), linear regression, logistic regression, stepwise regression, multivariate adaptive regression splines (MARS), locally estimated scatterplot smoothing (LOESS)), instance-based techniques (e.g., ridge regression, least absolute shrinkage and selection operator (LASSO), elastic net, least-angle regression (LARS)), decisions tree techniques (e.g., classification and regression tree (CART), iterative dichotomiser 3 (ID3), Chi-squared automatic interaction detection (CHAID), decision stump, conditional decision trees), Bayesian techniques (e.g., naïve Bayes, Gaussian naïve Bayes, multinomial naïve Bayes, average one-dependence estimators (AODE), Bayesian belief network (BNN), Bayesian networks), clustering techniques (e.g., k-means, k-medians, expectation maximization (EM), hierarchical clustering), association rule learning techniques (e.g., perceptron, back-propagation, hopfield network, Radial Basis Function Network (RBFN)), deep learning techniques (e.g., Deep Boltzmann Machine (DBM), Deep Belief Networks (DBN), Convolutional Neural Network (CNN), Stacked Auto-Encoders), Dimensionality Reduction Techniques (e.g., Principal Component Analysis (PCA), Principal Component Regression (PCR), Partial Least Squares Regression (PLSR), Sammon Mapping, Multidimensional Scaling (MDS), Projection Pursuit, Linear Discriminant Analysis (LDA), Mixture Discriminant Analysis (MDA), Quadratic Discriminant Analysis (QDA), Flexible Discriminant Analysis (FDA)), Ensemble Techniques (e.g., Boosting, Bootstrapped Aggregation (Bagging), AdaBoost, Stacked Generalization (blending), Gradient Boosting Machines (GBM), Gradient Boosted Regression Trees (GBRT), Random Forest), SVM (support vector machine), supervised learning, unsupervised learning, semi-supervised learning, etc.

Additional examples of architectures include neural networks such as ResNet-50, ResNet-101, VGG, DenseNet, PointNet, Xception, ConvNeXt, and the like; visual transformer(s) (ViT(s)), such as a bidirectional encoder from image transformers (BEIT), visual bidirectional encoder from transformers (VisualBERT), image generative pretrained transformer (Image GPT), data-efficient image transformers (DeiT), deeper vision transformer (DeepViT), convolutional vision transformer (CvT), detection transformer (DETR), Miti-DETR, or the like; and/or general or natural language processing transformers, such as BERT, GPT, GPT-2, GPT-3, or the like. In some examples, the ML model discussed herein may comprise PointPillars, SECOND, top-down feature layers (e.g., see U.S. patent application Ser. No. 15/963,833, which is incorporated by reference in its entirety herein for all purposes), and/or VoxelNet. Architecture latency optimizations may include MobilenetV2, Shufflenet, Channelnet, Peleenet, and/or the like. The ML model may comprise a residual block such as Pixor, in some examples.

In at least one example, the sensor system(s) 406 may include lidar sensors, radar sensors, ultrasonic transducers, sonar sensors, location sensors (e.g., GPS, compass, etc.), inertial sensors (e.g., inertial measurement units (IMUs), accelerometers, magnetometers, gyroscopes, etc.), cameras (e.g., RGB, IR, intensity, depth, time of flight, etc.), microphones, wheel encoders, environment sensors (e.g., temperature sensors, humidity sensors, light sensors, pressure sensors, etc.), etc. The sensor system(s) 406 may include multiple instances of each of these or other types of sensors. For instance, the lidar sensors may include individual lidar sensors located at the corners, front, back, sides, and/or top of the vehicle 402. As another example, the camera sensors may include multiple cameras disposed at various locations about the exterior and/or interior of the vehicle 402. The sensor system(s) 406 may provide input to the vehicle computing device 404. Additionally, or in the alternative, the sensor system(s) 406 may send sensor data, via the one or more networks 434, to the one or more computing device(s) 436 at a particular frequency, after a lapse of a predetermined period of time, in near real-time, etc.

The vehicle 402 may also include one or more emitters 408 for emitting light and/or sound. The emitter(s) 408 may include interior audio and visual emitters to communicate with passengers of the vehicle 402. By way of example and not limitation, interior emitters may include speakers, lights, signs, display screens, touch screens, haptic emitters (e.g., vibration and/or force feedback), mechanical actuators (e.g., seatbelt tensioners, seat positioners, headrest positioners, etc.), and the like. The emitter(s) 408 may also include exterior emitters. By way of example and not limitation, the exterior emitters may include lights to signal a direction of travel or other indicator of vehicle action (e.g., indicator lights, signs, light arrays, etc.), and one or more audio emitters (e.g., speakers, speaker arrays, horns, etc.) to audibly communicate with pedestrians or other nearby vehicles, one or more of which comprising acoustic beam steering technology.

The vehicle 402 may also include one or more communication connections 410 that enable communication between the vehicle 402 and one or more other local or remote computing device(s). For instance, the communication connection(s) 410 may facilitate communication with other local computing device(s) on the vehicle 402 and/or the drive system(s) 414. Also, the communication connection(s) 410 may allow the vehicle to communicate with other nearby computing device(s) (e.g., computing device 436, other nearby vehicles, etc.) and/or one or more remote sensor system(s) for receiving sensor data. The communications connection(s) 410 also enable the vehicle 402 to communicate with a remote teleoperations computing device or other remote services.

The communications connection(s) 410 may include physical and/or logical interfaces for connecting the vehicle computing device 404 to another computing device or a network, such as network(s) 434. For example, the communications connection(s) 410 may enable Wi-Fi-based communication such as via frequencies defined by the IEEE 802.11 standards, short range wireless frequencies such as Bluetooth, cellular communication (e.g., 2G, 3G, 4G, 4G LTE, 5G, etc.) or any suitable wired or wireless communications protocol that enables the respective computing device to interface with the other computing device(s)

In at least one example, the vehicle 402 may include one or more drive systems 414. In some examples, the vehicle 402 may have a single drive system 414. In at least one example, if the vehicle 402 has multiple drive systems 414, individual drive systems 414 may be positioned on opposite ends of the vehicle 402 (e.g., the front and the rear, etc.). In at least one example, the drive system(s) 414 may include one or more sensor systems to detect conditions of the drive system(s) 414 and/or the surroundings of the vehicle 402. By way of example and not limitation, the sensor system(s) may include one or more wheel encoders (e.g., rotary encoders) to sense rotation of the wheels of the drive modules, inertial sensors (e.g., inertial measurement units, accelerometers, gyroscopes, magnetometers, etc.) to measure orientation and acceleration of the drive module, cameras or other image sensors, ultrasonic sensors to acoustically detect objects in the surroundings of the drive module, lidar sensors, radar sensors, etc. Some sensors, such as the wheel encoders may be unique to the drive system(s) 414. In some cases, the sensor system(s) on the drive system(s) 414 may overlap or supplement corresponding systems of the vehicle 402 (e.g., sensor system(s) 406).

The drive system(s) 414 may include many of the vehicle systems, including a high voltage battery, a motor to propel the vehicle, an inverter to convert direct current from the battery into alternating current for use by other vehicle systems, a steering system including a steering motor and steering rack (which may be electric), a braking system including hydraulic or electric actuators, a suspension system including hydraulic and/or pneumatic components, a stability control system for distributing brake forces to mitigate loss of traction and maintain control, an HVAC system, lighting (e.g., lighting such as head/tail lights to illuminate an exterior surrounding of the vehicle), and one or more other systems (e.g., cooling system, safety systems, onboard charging system, other electrical components such as a DC/DC converter, a high voltage junction, a high voltage cable, charging system, charge port, etc.). Additionally, the drive system(s) 414 may include a drive module controller which may receive and preprocess data from the sensor system(s) and to control operation of the various vehicle systems. In some examples, the drive module controller may include one or more processors and memory communicatively coupled with the one or more processors. The memory may store one or more modules to perform various functionalities of the drive system(s) 414. Furthermore, the drive system(s) 414 may also include one or more communication connection(s) that enable communication by the respective drive module with one or more other local or remote computing device(s).

In at least one example, the direct connection 412 may provide a physical interface to couple the one or more drive system(s) 414 with the body of the vehicle 402. For example, the direct connection 412 may allow the transfer of energy, fluids, air, data, etc. between the drive system(s) 414 and the vehicle. In some instances, the direct connection 412 may further releasably secure the drive system(s) 414 to the body of the vehicle 402.

In at least one example, the localization component 420, the perception component 422, the prediction component 426, the planner component 428, the one or more system controllers 432, and the one or more maps 430 may process sensor data, as described above, and may send their respective outputs, over the one or more network(s) 434, to the computing device(s) 436. In at least one example, the localization component 420, the perception component 422, the prediction component 426, the planner component 428, the one or more system controllers 432, and the one or more maps 430 may send their respective outputs to the computing device(s) 436 at a particular frequency, after a lapse of a predetermined period of time, in near real-time, etc.

In some examples, the vehicle 402 may send sensor data to the computing device(s) 436 via the network(s) 434. In some examples, the vehicle 402 may receive sensor data from the computing device(s) 436 and/or remote sensor system(s) via the network(s) 434. The sensor data may include raw sensor data and/or processed sensor data and/or representations of sensor data. In some examples, the sensor data (raw or processed) may be sent and/or received as one or more log files.

The computing device(s) 436 may include processor(s) 438 and a memory 440, which may a clock manager 442. In some examples, the memory 440 may store one or more of components that are similar to the component(s) stored in the memory 418 of the vehicle 402. In such examples, the computing device(s) 436 may be configured to perform one or more of the processes described herein with respect to the vehicle 402. In some examples, the clock manager 442 may perform substantially similar functions as the electronic control unit 424.

The processor(s) 416 of the vehicle 402 and the processor(s) 438 of the computing device(s) 436 may be any suitable processor capable of executing instructions to process data and perform operations as described herein. By way of example and not limitation, the processor(s) may comprise one or more Central Processing Units (CPUs), Graphics Processing Units (GPUs), or any other device or portion of a device that processes electronic data to transform that electronic data into other electronic data that may be stored in registers and/or memory. In some examples, integrated circuits (e.g., ASICs, etc.), gate arrays (e.g., FPGAs, etc.), and other hardware devices may also be considered processors in so far as they are configured to implement encoded instructions.

Memory 418 and memory 440 are examples of non-transitory computer-readable media. The memory 418 and memory 440 may store an operating system and one or more software applications, instructions, programs, and/or data to implement the methods described herein and the functions attributed to the various systems. In various implementations, the memory may be implemented using any suitable memory technology, such as static random access memory (SRAM), synchronous dynamic RAM (SDRAM), nonvolatile/Flash-type memory, or any other type of memory capable of storing information. The architectures, systems, and individual elements described herein may include many other logical, programmatic, and physical components, of which those shown in the accompanying figures are merely examples that are related to the discussion herein.

It should be noted that while FIG. 4 is illustrated as a distributed system, in alternative examples, components of the vehicle 402 may be associated with the computing device(s) 436 and/or components of the computing device(s) 436 may be associated with the vehicle 402. That is, the vehicle 402 may perform one or more of the functions associated with the computing device(s) 436, and vice versa.

The methods described herein represent sequences of operations that may be implemented in hardware, software, or a combination thereof. In the context of software, the blocks represent computer-executable instructions stored on one or more computer-readable storage media that, when executed by one or more processors, perform the recited operations. Generally, computer-executable instructions include routines, programs, objects, components, data structures, and the like that perform particular functions or implement particular abstract data types. The order in which the operations are described is not intended to be construed as a limitation, and any number of the described operations may be combined in any order and/or in parallel to implement the processes. In some examples, one or more operations of the method may be omitted entirely. For instance, the operations may include determining a first action and a second action by the vehicle relative to a selected trajectory without determining a respective cost for one or more of the actions by the vehicle. Moreover, the methods described herein may be combined in whole or in part with each other or with other methods.

The various techniques described herein may be implemented in the context of computer-executable instructions or software, such as program modules, that are stored in computer-readable storage and executed by the processor(s) of one or more computing devices such as those illustrated in the figures. Generally, program modules include routines, programs, objects, components, data structures, etc., and define operating logic for performing particular tasks or implement particular abstract data types.

Other architectures may be used to implement the described functionality and are intended to be within the scope of this disclosure. Furthermore, although specific distributions of responsibilities are defined above for purposes of discussion, the various functions and responsibilities might be distributed and divided in different ways, depending on circumstances.

Figure 5:
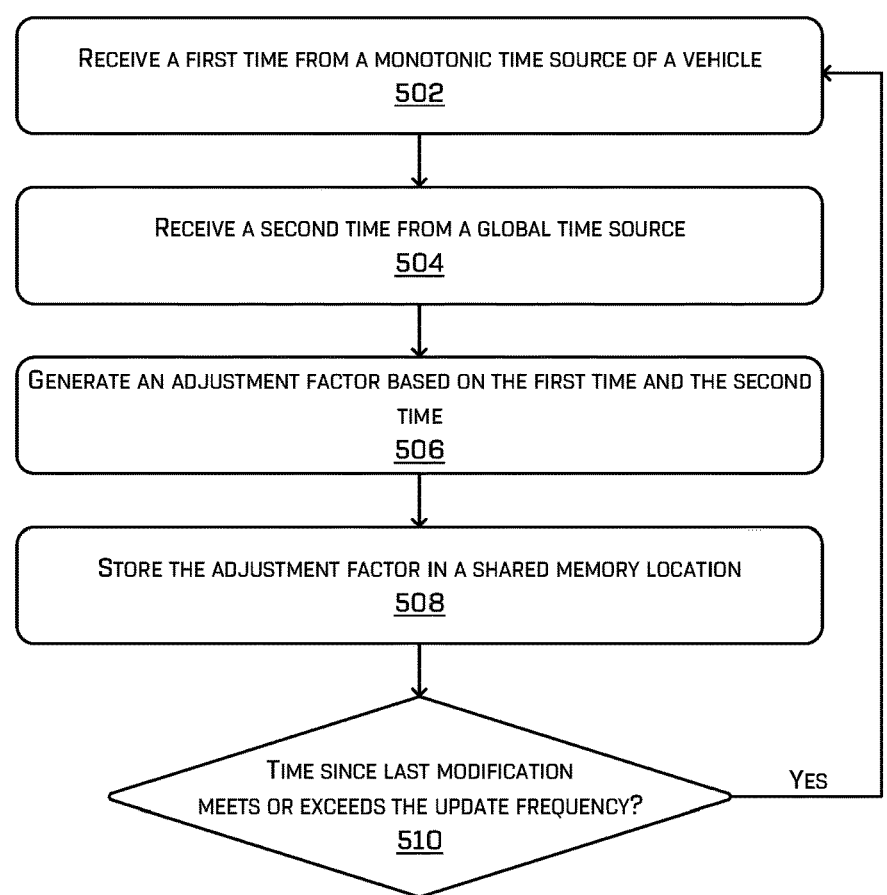
FIG. 5 is a flow diagram illustrating an example process of receiving monotonic and global time values, determining an adjustment factor based on the time values, and storing the adjustment factor in a shared memory location.

Similarly, software may be stored and distributed in various ways and using different means, and the particular software storage and execution configurations described above may be varied in many different ways. Thus, software implementing the techniques described above may be distributed on various types of computer FIG. 5 is a flow diagram illustrating an example process 500 of receiving monotonic and global time values, determining an adjustment factor based on the time values, and/or storing the adjustment factor in a shared memory location readable by a component of the vehicle. As described below, the process 500 may be performed by one or more computer-based components configured to implement various functionalities described herein. For instance, some or all of the operations of process 500 may be performed by a clock manager 104. As described above, a clock manager 104 may be integrated as an on-vehicle system in some examples. However, in other examples, clock manager 104 may be integrated as a separate server-based system.

Process 500 is illustrated as collections of blocks in a logical flow diagram, representing sequences of operations, some or all of which can be implemented in hardware, software, or a combination thereof. In the context of software, the blocks represent computer-executable instructions stored on one or more computer-readable media that, when executed by one or more processors, perform the recited operations. Generally, computer-executable instructions include routines, programs, objects, components, encryption, deciphering, compressing, recording, data structures, and the like that perform particular functions or implement particular abstract data types. The order in which the operations are described should not be construed as a limitation. Any number of the described blocks can be combined in any order and/or in parallel to implement the processes, or alternative processes, and not all of the blocks need to be executed in all examples. For discussion purposes, the processes herein are described in reference to the frameworks, architectures and environments described in the examples herein, although the processes may be implemented in a wide variety of other frameworks, architectures or environments.

At operation 502, the clock manager may receive a first time value from a monotonic time source of a vehicle. A monotonic time source may be a hardware component disposed on the CPU located on the ECU. The monotonic clock may be updated or otherwise incremented by a counter (e.g., generic timer) that measures the passage of time. In some instances, each core of the CPU may include an individual counter. The monotonic clock may have a high-resolution level that results in the monotonic clock being updated every 100 nanoseconds. Of course, in other examples the monotonic clock may be updated at a higher or lower frequency.

At operation 504, the clock manager may receive a second time value from a global time source. In some examples, the clock manager may receive the global time value from a PTP clock that is located on the ECU. The PTP clock may be updated once a second based on a global positioning system ("GPS") located on the ECU. In some examples, the GPS may be updated once every second by an external source with global time data. Of course, in other examples the PTP clock and the GPS may be updated at different rates and/or and higher or lower frequencies. In some examples, the GPS may be updated by an external source, the PTP clock updates or otherwise syncs with the GPS clock, and the clock manager receives the global time value from the PTP clock.

At operation 506, the clock manager may generate an adjustment factor based on the first time value and the second time value. Specifically, the clock manager may determine an adjustment factor based on the global time value and the monotonic time value. The adjustment factor may be used to convert the monotonic time value to a global time frame. Further, the adjustment factor may be a constantly updated offset that may be applied to the monotonic time value. In some examples, the clock manager may determine the adjustment factor by subtracting the global time (i.e., received by the PTP clock) from the monotonic time value.

At operation 508, the clock manager may store the adjustment factor in a location of the shared memory that is read-only accessible to various vehicle components. In some examples, storing the adjustment factor in the shared memory may include writing and/or updating the adjustment factor to a same or different location in shared memory as the previous adjustment factor. As described above, components of the vehicle may read the adjustment factor from the shared memory to determine a predicted current real time.

At operation 510, the clock manager may determine whether the time since the last adjustment factor modification meets or exceeds the update frequency. That is, the clock manager may determine a frequency at which the clock manager updates the adjustment factor, and determine if it is time for the clock manager to update the adjustment factor. If the clock manager determines it is time to update the adjustment factor (510: Yes), the clock manager may return to operation 502 and perform the operations again. If the clock manager determines that it is not time to update the adjustment factor (510: No), the clock manager may wait until it is time to update the adjustment factor.

EXAMPLE CLAUSES

A: A system comprising: one or more processors; and one or more non-transitory computer-readable media storing computer-executable instructions that, when executed, cause the one or more processors to perform operations comprising: receiving, from a monotonic time source associated with an autonomous vehicle, a first time value, wherein the monotonic time source is updated at a first frequency; receiving, based at least in part on a global positioning system associated with the autonomous vehicle, a second time value, wherein the second time value is updated at a second frequency that is different than the first frequency; generating, by a computing system associated with the autonomous vehicle and based at least in part on the first time value and the second time value, a modifying value; storing, in a shared memory, the modifying value for read access by a user component of the autonomous vehicle, wherein the user component is prevented from writing to the shared memory at a location where the modifying value is stored; determining, by the user component and based at least in part on the modifying value, a predicted current time; and performing an action on the autonomous vehicle based at least in part on the predicted current time.

B: The system of paragraph A, wherein the user component determines the predicted current time based at least in part on the modifying value and a local clock of the system.

C: The system of paragraph B, wherein the local clock is the monotonic time source.

D: The system of paragraph A, the operations further comprise: causing the modifying value to be updated at a modified frequency, while retaining a scheduler frequency of a scheduler operating on the autonomous vehicle.

E: The system of paragraph A, wherein the monotonic time source is based on a counter associated with a central processing unit of the autonomous vehicle.

F: One or more non-transitory computer-readable media storing instructions executable by one or more processors, wherein the instructions, when executed, cause the one or more processors to perform operations comprising: receiving, from a monotonic time source associated with a robot, a first time value, wherein the monotonic time source includes a first frequency; receiving, from a global time source associated with the robot, a second time value, wherein the global time source includes a second frequency that is different than the first frequency; generating, by a computing system associated with the robot and based at least in part on the first time value and the second time value, a modifying value; and storing, in a shared memory, the modifying value for read access by a user component of the robot.

G: The one or more non-transitory computer-readable media of paragraph F, wherein a clock value associated with the user component is generated based at least in part on the modifying value and a local clock source of the robot.

H: The one or more non-transitory computer-readable media of paragraph F, wherein: an operating system associated with the robot includes a scheduler operating at a scheduler frequency; and the scheduler frequency is different than the first frequency.

I: The one or more non-transitory computer-readable media of paragraph H, the operations further comprise: causing the modifying value to be updated at a modified frequency different from the scheduler frequency, while retaining the scheduler frequency of the scheduler.

J: The one or more non-transitory computer-readable media of paragraph F, wherein the monotonic time source is based on a counter associated with a central processing unit of the robot.

K: The one or more non-transitory computer-readable media of paragraph F, the operations further comprise: receiving, by the global time source, the second time value from a global positioning system.

L: The one or more non-transitory computer-readable media of paragraph F, wherein the first frequency is higher than the second frequency.

M: The one or more non-transitory computer-readable media of paragraph F, the operations further comprise: determining, by the user component, based on accessing the monotonic time source, a third time value; and adding, by the user component, the modifying value to the third time value to determine a current global time value.

N: The one or more non-transitory computer-readable media of paragraph F, wherein the user component lacks permissions to modify the modifying value in the shared memory.

O: The one or more non-transitory computer-readable media of paragraph F, wherein: a clock manager component of the robot generates the modifying value; a user component of the robot reads the modifying value from the shared memory; and the clock manager has a higher priority than the user component such that the clock manager's generation of the modifying value takes precedence by a scheduling component over the user component's reading of the modifying value.

P: A method comprising: receiving, from a monotonic time source associated with a robot, a first time value, wherein the monotonic time source includes a first frequency; receiving, from a global time source associated with the robot, a second time value, wherein the global time source includes a second frequency that is different than the first frequency; generating, by a computing system associated with the robot and based at least in part on the first time value and the second time value, a modifying value; and storing, in a shared memory, the modifying value for read access by a user component of the robot.

Q: The method of paragraph P, wherein a clock value associated with the user component is generated based at least in part on the modifying value and a local clock source of the robot.

R: The method of paragraph P, wherein: an operating system associated with the robot includes a scheduler operating at a scheduler frequency; and the scheduler frequency is different than the first frequency.

S: The method of paragraph R, further comprising: causing the modifying value to be updated at a modified frequency different from the scheduler frequency, while retaining the scheduler frequency of the scheduler.

T: The method of paragraph P, wherein the user component lacks permissions to modify the modifying value in the shared memory.

While the example clauses described above are described with respect to particular implementations, it should be understood that, in the context of this document, the content of the example clauses can be implemented via a method, device, system, a computer-readable medium, and/or another implementation. Additionally, any of examples A-T may be implemented alone or in combination with any other one or more of the examples A-T.

CONCLUSION

While one or more examples of the techniques described herein have been described, various alterations, additions, permutations and equivalents thereof are included within the scope of the techniques described herein.

In the description of examples, reference is made to the accompanying drawings that form a part hereof, which show by way of illustration specific examples of the claimed subject matter. It is to be understood that other examples may be used and that changes or alterations, such as structural changes, may be made. Such examples, changes or alterations are not necessarily departures from the scope with respect to the intended claimed subject matter. While the steps herein may be presented in a certain order, in some cases the ordering may be changed so that certain inputs are provided at different times or in a different order without changing the function of the systems and methods described. The disclosed procedures could also be executed in different orders. Additionally, various computations that are herein need not be performed in the order disclosed, and other examples using alternative orderings of the computations could be readily implemented. In addition to being reordered, the computations could also be decomposed into sub-computations with the same results.

Although the subject matter has been described in language specific to structural features and/or methodological acts, it is to be understood that the subject matter defined in the appended claims is not necessarily limited to the specific features or acts described. Rather, the specific features and acts are disclosed as example forms of implementing the claims.

The components described herein represent instructions that may be stored in any type of computer-readable medium and may be implemented in software and/or hardware. All of the methods and processes described above may be embodied in, and fully automated via, software code modules and/or computer-executable instructions executed by one or more computers or processors, hardware, or some combination thereof. Some or all of the methods may alternatively be embodied in specialized computer hardware.

Conditional language such as, among others, "may," "could," "may" or "might," unless specifically stated otherwise, are understood within the context to present that certain examples include, while other examples do not include, certain features, elements and/or steps. Thus, such conditional language is not generally intended to imply that certain features, elements and/or steps are in any way required for one or more examples or that one or more examples necessarily include logic for deciding, with or without user input or prompting, whether certain features, elements and/or steps are included or are to be performed in any particular example.

Conjunctive language such as the phrase "at least one of X, Y or Z," unless specifically stated otherwise, is to be understood to present that an item, term, etc. may be either X, Y, or Z, or any combination thereof, including multiples of each element. Unless explicitly described as singular, "a" means singular and plural.

Any routine descriptions, elements or blocks in the flow diagrams described herein and/or depicted in the attached figures should be understood as potentially representing modules, segments, or portions of code that include one or more computer-executable instructions for implementing specific logical functions or elements in the routine. Alternate implementations are included within the scope of the examples described herein in which elements or functions may be deleted, or executed out of order from that shown or discussed, including substantially synchronously, in reverse order, with additional operations, or omitting operations, depending on the functionality involved as would be understood by those skilled in the art.

Many variations and modifications may be made to the above-described examples, the elements of which are to be understood as being among other acceptable examples. All such modifications and variations are intended to be included herein within the scope of this disclosure and protected by the following claims.

The invention claimed is:

1. A system comprising:
one or more processors; and
one or more non-transitory computer-readable media storing computer-executable instructions that, when executed, cause the one or more processors to perform operations comprising:
receiving, from a monotonic time source associated with an autonomous vehicle, a first time value, wherein the monotonic time source is updated at a first frequency;
receiving, based at least in part on a global positioning system associated with the autonomous vehicle, a second time value, wherein the second time value is updated at a second frequency that is different than the first frequency;
generating, by a computing system associated with the autonomous vehicle and based at least in part on the first time value and the second time value, a time adjustment offset according to a third frequency that is different than an operating system update frequency;
storing, in a shared memory, the time adjustment offset for read access by a user component of the autonomous vehicle, wherein the user component is prevented from writing to the shared memory at a location where the time adjustment offset is stored;

determining, by the user component and based at least in part on the time adjustment offset, a predicted current time; and
performing an action on the autonomous vehicle based at least in part on the predicted current time.

2. The system of claim 1, wherein the user component determines the predicted current time based at least in part on the time adjustment offset and a local clock of the system.

3. The system of claim 2, wherein the local clock is the monotonic time source.

4. The system of claim 1, the operations further comprise:
causing the time adjustment offset to be updated at a modified frequency, while retaining a scheduler frequency of a scheduler operating on the autonomous vehicle.

5. The system of claim 1, wherein the monotonic time source is based on a counter associated with a central processing unit of the autonomous vehicle.

6. The system of claim 1, wherein determining the predicted current time is based at least in part on accessing the time adjustment offset from the shared memory.

7. The system of claim 1, wherein updating the monotonic time source includes incrementing the monotonic time source according to the first frequency.

8. One or more non transitory computer readable media storing instructions executable by one or more processors, wherein the instructions, when executed, cause the one or more processors to perform operations comprising:
receiving, from a monotonic time source associated with a robot, a first time value, wherein the monotonic time source includes a first frequency;
receiving, from a global time source associated with the robot, a second time value, wherein the global time source includes a second frequency that is different than the first frequency;
generating, by a computing system associated with the robot and based at least in part on the first time value and the second time value, a time adjustment offset according to a third frequency that is different than an operating system update frequency; and
storing, in a shared memory, the time adjustment offset for read access by a user component of the robot.

9. The one or more non transitory computer readable media of claim 8, wherein a clock value associated with the user component is generated based at least in part on the time adjustment offset and a local clock source of the robot.

10. The one or more non transitory computer readable media of claim 8, wherein:
the operating system associated with the robot includes a scheduler operating at a scheduler frequency; and
the scheduler frequency is different than the first frequency.

11. The one or more non transitory computer readable media of claim 10, the operations further comprise:
causing the time adjustment offset to be updated at a modified frequency different from the scheduler frequency, while retaining the scheduler frequency of the scheduler.

12. The one or more non transitory computer readable media of claim 8, wherein the monotonic time source is based on a counter associated with a central processing unit of the robot.

13. The one or more non transitory computer readable media of claim 8, the operations further comprise:
determining, by the user component, based on accessing the monotonic time source, a third time value; and adding, by the user component, the time adjustment offset to the third time value to determine a current global time value.

14. The one or more non transitory computer readable media of claim 8, wherein the user component lacks permissions to modify the time adjustment offset in the shared memory.

15. The one or more non transitory computer readable media of claim 8, wherein:

a clock manager component of the robot generates the time adjustment offset;

a user component of the robot reads the time adjustment offset modifying value from the shared memory; and the clock manager component has a higher priority than the user component such that the clock manager's generation of the time adjustment offset takes precedence by a scheduling component over the user component's reading of the time adjustment offset.

16. A method comprising:

receiving, from a monotonic time source associated with a robot, a first time value, wherein the monotonic time source includes a first frequency;

receiving, from a global time source associated with the robot, a second time value, wherein the global time source includes a second frequency that is different than the first frequency;

generating, by a computing system associated with the robot and based at least in part on the first time value and the second time value, a time adjustment offset according to a third frequency that is different than an operating system update frequency; and storing, in a shared memory, the time adjustment offset for read access by a user component of the robot.

17. The method of claim 16, wherein a clock value associated with the user component is generated based at least in part on the time adjustment offset and a local clock source of the robot.

18. The method of claim 16, wherein:

the operating system associated with the robot includes a scheduler operating at a scheduler frequency; and the scheduler frequency is different than the first frequency.

19. The method of claim 18, further comprising:

causing the time adjustment offset to be updated at a modified frequency different from the scheduler frequency, while retaining the scheduler frequency of the scheduler.

20. The method of claim 16, wherein the user component lacks permissions to modify the time adjustment offset in the shared memory.

* * * * *